(12) United States Patent
Munakata et al.

(10) Patent No.: US 7,063,419 B1
(45) Date of Patent: Jun. 20, 2006

(54) SUNGLASS WITH MULTISTAGE STOP FUNCTION AND ATTACHMENT FITTING THEREOF

(75) Inventors: Yoshikazu Munakata, Nishi-ku (JP); Hiroyuki Kawabata, Sabae (JP)

(73) Assignees: Sunray Corporation, Osaka (JP); Sasamata Co., Ltd., Fukui (JP)

( * ) Notice: Subject to any disclaimer, the term of this patent is extended or adjusted under 35 U.S.C. 154(b) by 0 days.

(21) Appl. No.: 11/003,711

(22) Filed: Dec. 3, 2004

(51) Int. Cl.
*G02C 9/00* (2006.01)

(52) U.S. Cl. .......................................... 351/47; 351/57
(58) Field of Classification Search ................. 351/47, 351/48, 57, 58, 41, 44, 158
See application file for complete search history.

(56) References Cited

U.S. PATENT DOCUMENTS 6,302,538 B1 * 10/2001 Friedman ..................... 351/48
6,755,521 B1 * 6/2004 Begg ........................... 351/48
6,783,234 B1 * 8/2004 Hong ........................... 351/47
6,971,744 B1 * 12/2005 Cummings ................... 351/47

* cited by examiner

*Primary Examiner*—Hung Xuan Dang
(74) *Attorney, Agent, or Firm*—Koda & Androlia

(57) ABSTRACT

The present invention relates to a sunglass attachable to a pair of glasses at a later stage, which sunglass is reliably attached to the glasses and in which a sunglass plate is stably held at a flipped position, and also relates to an attachment fitting thereof. The attachment fitting includes a shaft strip, a base, a base contacting strip, an elastic body, and an elastic receiving strip. The base is rotatable with respect to the shaft strip, and the base contacting strip and the elastic receiving strip are fixed so as not to rotate with respect to the shaft strip. With the elastic force of the elastic body, the base contacting strip is pressed towards the base and the base contacting strip and the base are engaged, thus allowing the sunglass plate attached to ends of the shaft strip to be freely raised upwards and lowered downwards and to be freely stopped in stages.

7 Claims, 9 Drawing Sheets

FIG. 16 RIOR ART
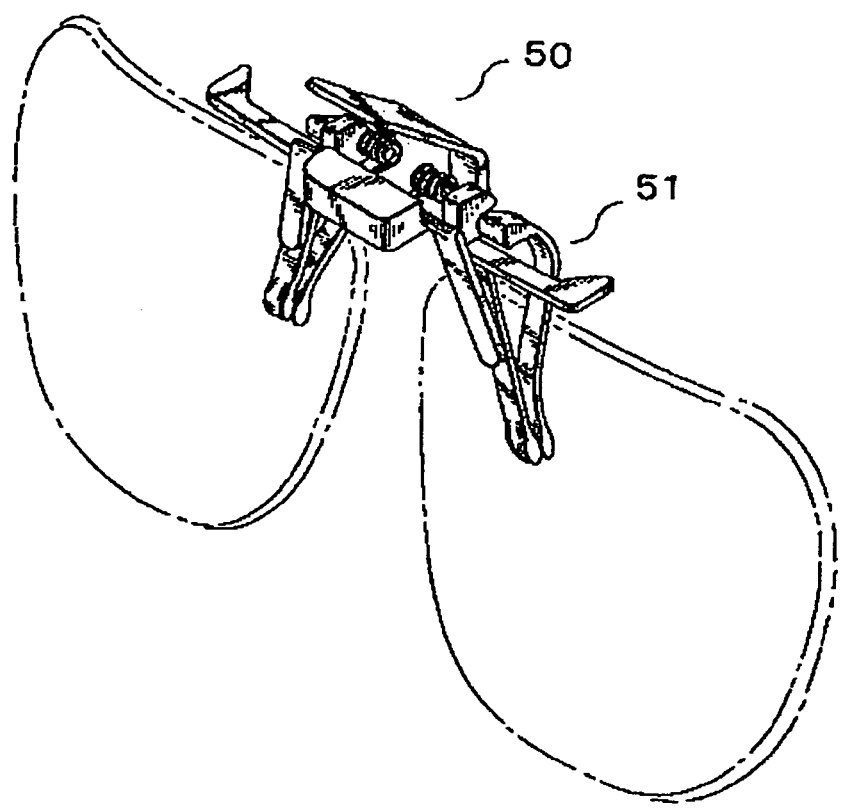

SUNGLASS WITH MULTISTAGE STOP FUNCTION AND ATTACHMENT FITTING THEREOF

BACKGROUND OF THE INVENTION

1. Field of the Invention

The present invention relates to a sunglass freely attachable and detachable to a pair of glasses and an attachment fitting thereof.

2. Description of the Related Art

The sunglass attachable to one's own glasses at a later stage is very cheap compared to a prescription sunglass, and is widely used for outdoor activities such as, fishing and driving, and furthermore, for everyday life.

A sunglass, in which the sunglass plates can be flipped upward when necessary, is known. Such sunglass has an advantage that the user can temporarily stop using the sunglass when in indoor or in a dark place such as, in the tunnel.

Such sunglass of the related art includes a sunglass in which a holding clip (50) of a clothes peg shape is provided at a bridge section at the center of the sunglass, as shown in FIG. 16 (U.S. Pat. DES. 350,359 filed by Friedman in Sep. 6, 1994).

However, in the related art shown in FIG. 16, the holding clip (50) is projected at a noticeable location or above the bridge section at the center of the sunglass, and thus the outer appearance is not stylish.

Further, the attachment fitting is heavy and when used for a long time, the load on the nose of the user becomes great.

Further, when the sunglass plates are flipped upwards, the holding state is unstable since a point at where the sunglass plates are stopped is not present, and thus the sunglass plates sometimes fall down during use.

Moreover, the lenses of the glasses are held from the back side with the holding arm (51) extending from the holding clip, and thus may fall off from the glasses during use.

SUMMARY OF THE INVENTION

The present invention focuses on the above conventional problems and provides a sunglass in which the size, shape and configuration of the attachment fitting are devised, and an attachment fitting thereof.

More specifically, the present invention aims to provide a small and light sunglass having a good design and without an unpleasant outer appearance and an attachment fitting thereof.

The present invention further aims to provide a sunglass stably held at a position to where the sunglass is flipped and reliably attached to the glasses and an attachment fitting thereof.

Other characteristics and advantages of the present invention will be apparent from the following description in conjunction with the accompanying drawings.

BRIEF DESCRIPTION OF THE DRAWINGS

FIG. 16 is a view showing a conventional sunglass.

DESCRIPTION OF THE PREFERRED EMBODIMENTS

The sunglass attachment fitting according to the present invention will now be explained based on the figures.

Figure 1:
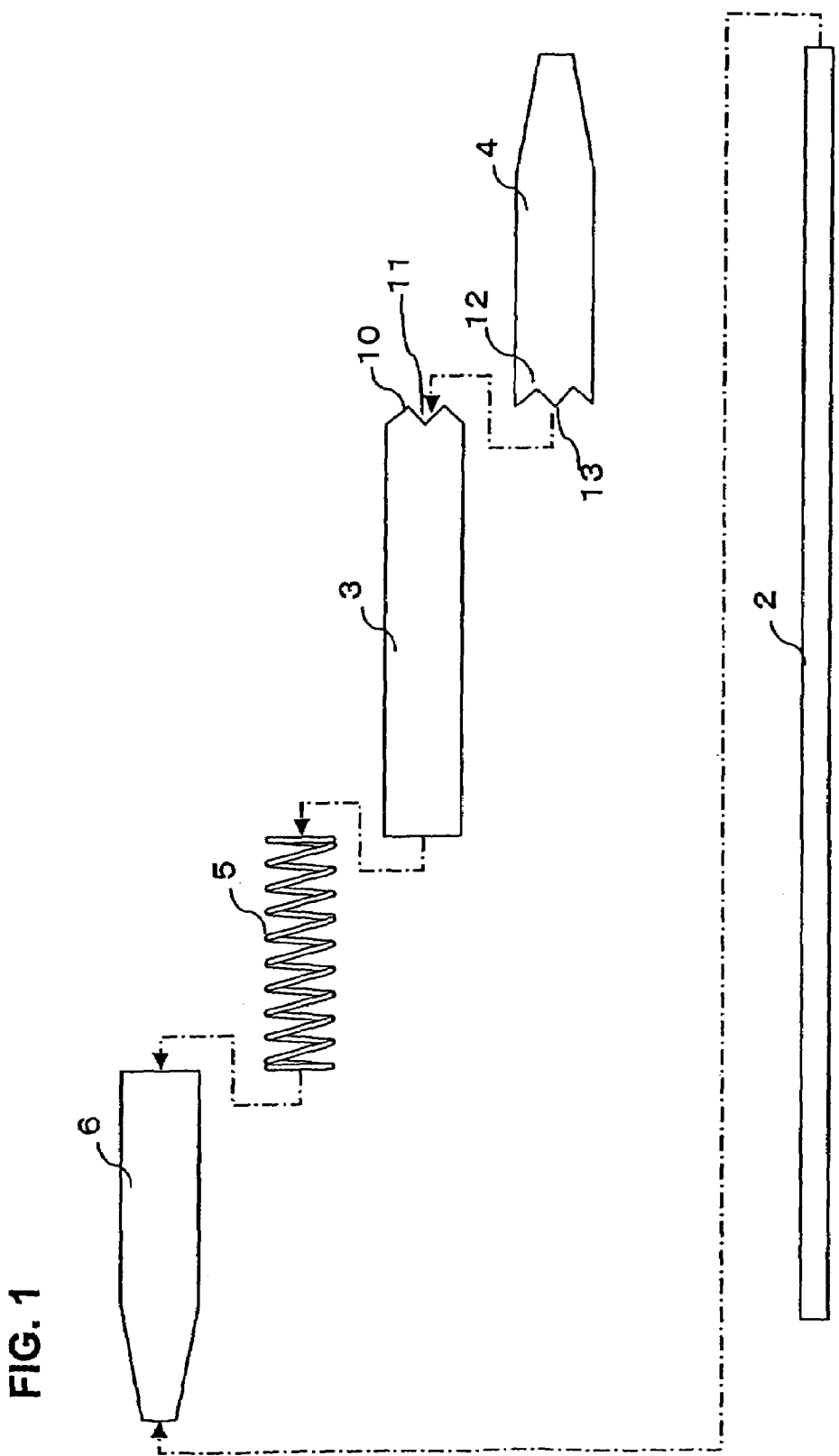
FIG. 1 is a view showing a configuration of an attachment fitting of the present invention.
Figure 2:
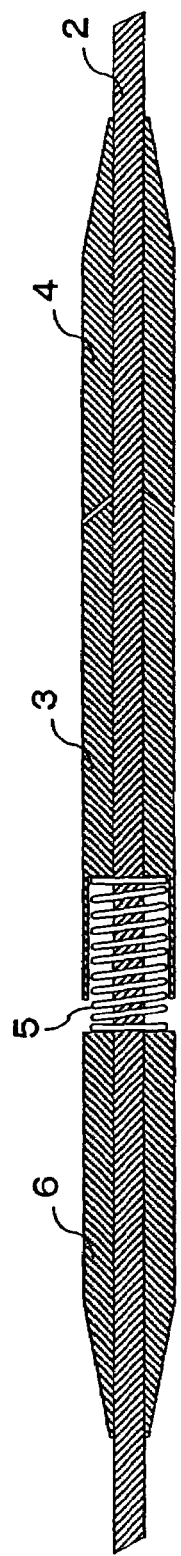
FIG. 2 is a cross sectional view of the attachment fitting of the present invention.
Figure 3:
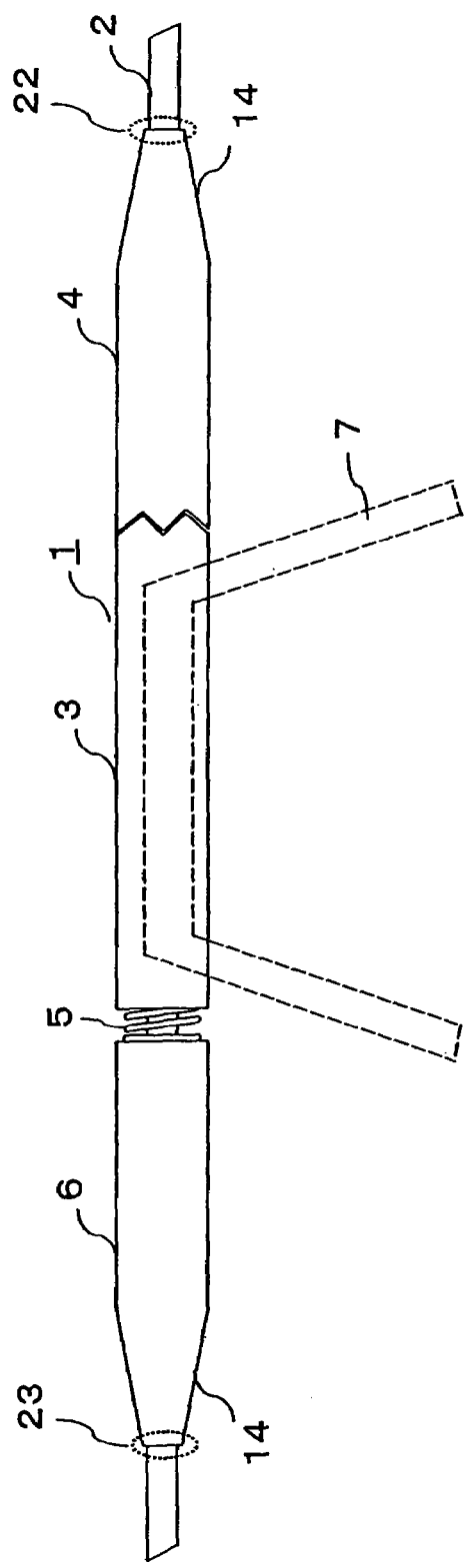
FIG. 3 is a front view of the attachment fitting of the present invention.
Figure 4:
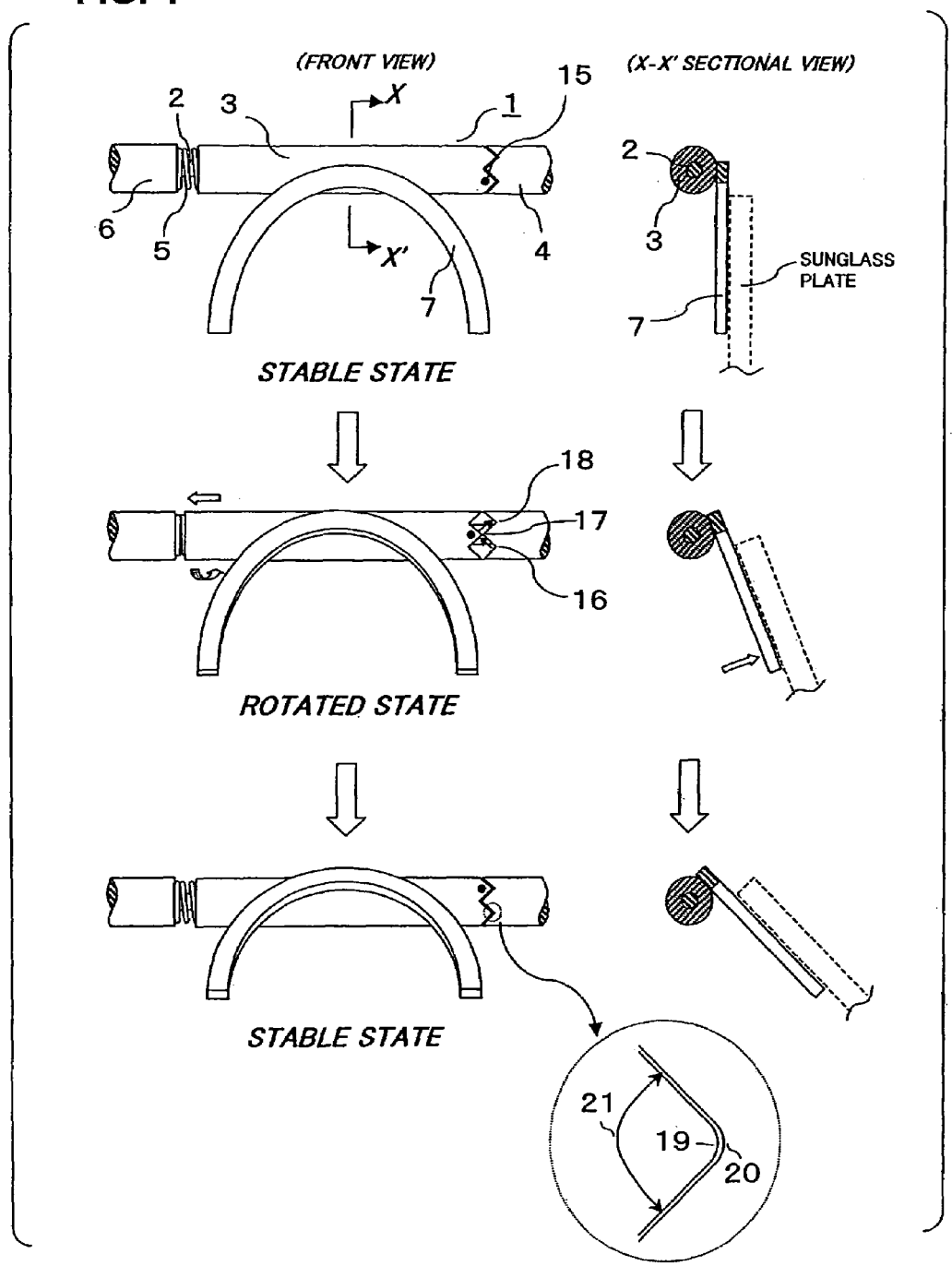
FIG. 4 is a view showing a multistage stop mechanism of the attachment fitting of the present invention.
Figure 5:
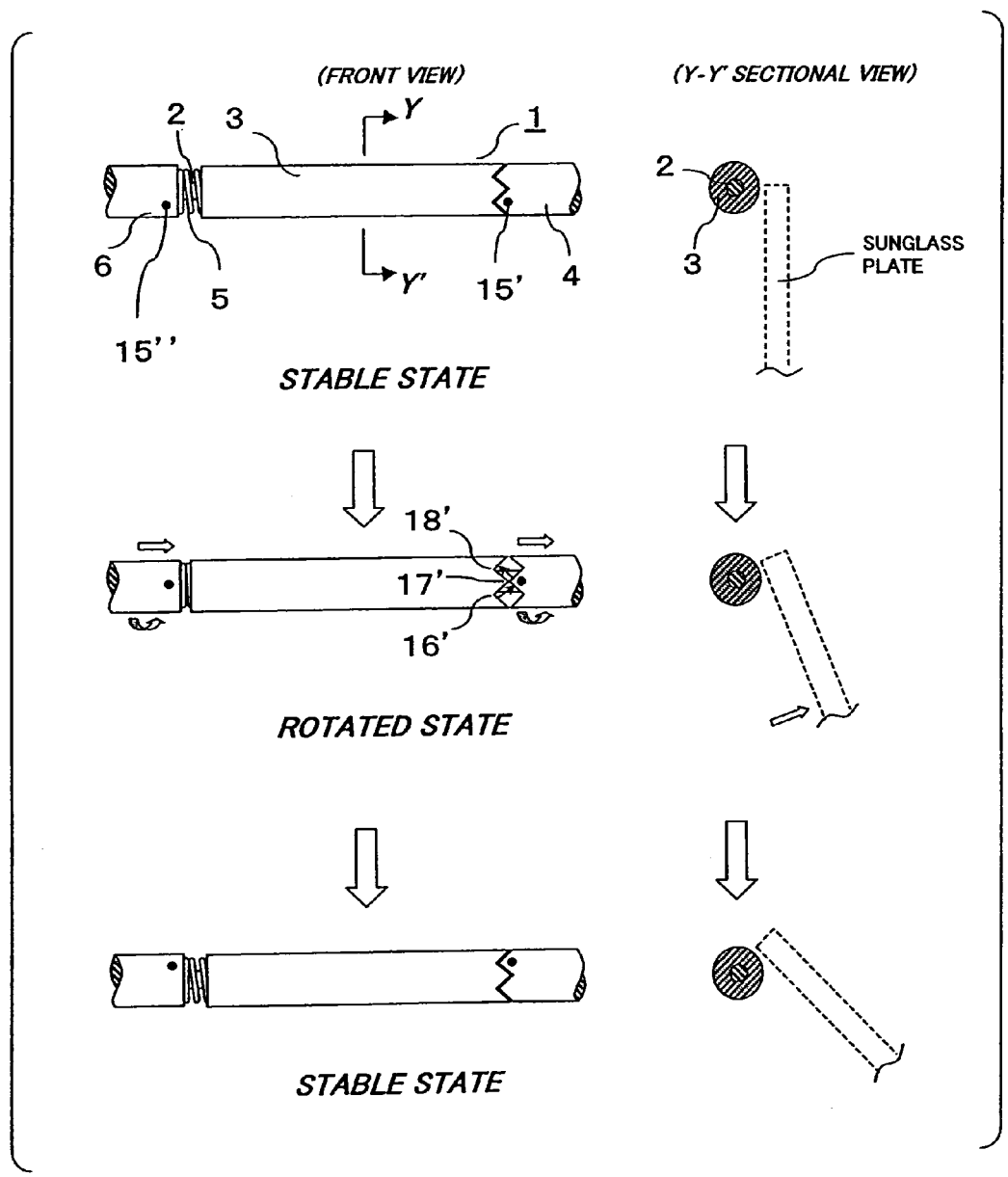
FIG. 5 is a view showing another multistage stop mechanism of the attachment fitting of the present invention.

FIG. 1 is a view showing a configuration of an attachment fitting according to the present invention. FIG. 2 is a cross sectional view of the attachment fitting according to the present invention. FIG. 3 is a front view of the attachment fitting according to the present invention. FIG. 4 is a view showing a multistage stop mechanism of the attachment fitting according to the present invention. FIG. 5 is a view showing another multistage stop mechanism of the attachment fitting of the present invention.

As shown in FIG. 1, the attachment fitting is configured from a shaft strip (2), a base (3), a base contacting strip (4), a coiled spring (5), and an elastic receiving strip (6).

The base (3), the base contacting strip (4) and the elastic receiving strip (6) are configured to a tubular body through which the rod-shaped shaft strip (2) passes, as shown in FIG. 2.

As shown in FIG. 1, a ridge part (10) and a valley part (11) are arranged at the end of the base (3) contacting the base contacting strip (4) along the outer periphery of the end of the base in an alternately continuing manner. Similarly, a valley part (12) and a ridge part (13) of the same shape is arranged at the end of the base contacting strip (4) contacting the base (3) in an alternately continuing manner.

As shown in FIG. 2, the coiled spring (5) is wounded around the shaft strip (2) in a coil-shape. The base (3) contacts the elastic receiving strip (6) by way of the coiled spring (5). As shown in FIG. 2, one end of the base (3) is cut to a shape to include one part of the coiled spring (5) in the base (3). Consequently, the coiled spring is protected and the outer appearance of the attachment fitting becomes smarter.

The surface of one end of the elastic receiving strip (6) contacting the coiled spring (5), besides a part where the shaft strip (2) passes, is flat and is not cut. Therefore, the coiled spring (5) contacts a very clean flat surface of the elastic receiving strip (6). Thus, twist or plastic deformation of the coiled spring (5) is suppressed and the durability is enhanced.

The base (3) and the shaft strip (2) are not fixed so that the base (3) is rotatable with respect to the fixed shaft strip (2) or the shaft strip (2) is rotatable with respect to the fixed base (3).

The base contacting strip (4) and the elastic receiving strip (6) positioned on both ends of the base (3) are fixed to the shaft strip (2) so as not to rotate with respect to the shaft strip (2), or so as to integrally move with the shaft strip (2).

As shown in FIG. 1, the base (3) and the base contacting strip (4) are stably contacted as a result of the engagement of one of the ridge part (10) (13) with the other valley part (12) (11).

The base (3) and the elastic receiving strip (6) are contacted by way of the coiled spring (5). The coiled spring (5) is attached between the base (3) and the elastic receiving strip (6) in a state somewhat compressed from the natural length thereof.

The base contacting strip (4) and the elastic receiving strip (6) are fixed to the shaft strip (2), and the coiled spring (5) is elastically attached between the base (3) and the elastic receiving strip (6), and thus the base (3) and the base contacting strip (4) are held in an engaged state by the elastic force of the coiled spring (5).

The base (3) and the elastic receiving strip (6) are arranged with a constant spacing in between to exhibit a multistage stop mechanism of the sunglass plates, to be hereinafter described.

The attachment fitting (1) as shown in FIG. 3 is thereby formed. A sunglass plate attaching arm (7) is attached to the base (3), and the sunglass plates are attached to the sunglass plate attaching arm (7). In this case, the sunglass plates, the sunglass attaching arm (7), and the base (3) are interlocked and thus move as one unit. The multistage stop mechanism of the sunglass plates in this case is shown in FIG. 4.

The shape of the sunglass plate attaching arm (7), the attachment method of the sunglass plate attaching arm (7) to the base (3), and the attachment method of the sunglass plates to the sunglass plate attaching arm (7) will not be discussed herein.

A sunglass plate attaching strip to which the sunglass plates can be attached may be arranged at both ends of the shaft strip (2) extending in the left and right direction so as to be continuous from the shaft strip (2), without using the sunglass plate attaching arm (7). In this case, the sunglass plates, the sunglass plate attaching strip, the shaft strip (2), the base contacting strip (4) and the elastic receiving strip (6) are interlocked and thus move as one unit. The multistage stop mechanism of the sunglass plate in this case is shown in FIG. 5.

As shown in FIG. 3, when a taper (14) is formed on the base contacting strip (4) and the elastic receiving strip (6), the outer appearance of the attachment fitting (1) is more smarter and thus is more preferable.

A joining end (22) of the base contacting strip (4) and the shaft strip (2) and a joining end (23) of the elastic receiving strip (6) and the shaft strip (2) are preferably processed so as not to form a space by performing brazing or caulking.

The multistage stop mechanism of the sunglass plates provided in the attachment fitting of the present invention will now be explained based on FIG. 4. FIG. 4 is a view showing a mechanism in which the shaft strip (2), the base contacting strip (4), and the elastic receiving strip (6) are fixed so as not to rotate with respect to the glasses, and the base (3) is rotatable about the shaft strip (2). Point (15) is given for purposes of explanation.

As shown in FIG. 4, in the initial stable state, the base (3) is pressed against the base contacting strip (4) by the elastic force of the coiled spring (5) included in the attachment fitting (1). The base (3) and the base contacting strip (4) are engaged with respect to each other and in a stable state.

When the sunglass plate attaching arm (7) is pushed upwards from such state, the base (3) is rotated about the shaft strip (2) in conjunction therewith. Simultaneously, the base (3) exhibits a movement of moving along the shaft strip (2).

As shown in FIG. 4, the ridge part denoted with point (15) of the base (3) moves about the shaft strip (2), in accordance with the rotation thereof, while contacting the valley part (16)—the ridge part (17)—the valley part (18) of the base contacting strip (4).

When the ridge part denoted with point (15) of the base (3) moves from the valley part (16) to the ridge part (17) of the base contacting strip (4) in response to the application of the external force to push the sunglass plate attaching arm (7) upwards, the base (3) moves towards the elastic receiving strip (6) against the elastic force of the coiled spring (5) by the applied external force.

When the ridge part denoted with point (15) of the base (3) moves from the ridge part (17) towards the valley part (18) of the base contacting strip (4), the base (3) now moves so as to return back towards the base contacting strip (4) by the biasing force of the coiled spring (5). The base (3) and the base contacting strip (4) are thereby again engaged and in the stable state.

A space allowing the movement of the base (3) in such direction of the shaft strip (2) must be provided between the base (3) and the elastic receiving strip (6).

The above are the steps for the base (3) to change from one stable state to the next stable state. The user may, of course, continuously perform such step, or rotate the base (3) in the opposite direction by pushing the sunglass plate attaching plate (7) downwards.

As shown in FIG. 4, an angle (21) formed by the ridge part (19) and the valley part (20) provided on the base (3) and the base contacting strip (4), respectively, is preferably equal to or greater than 90° so that the base (3) can be rotated smoothly. More preferably, a projecting corner of the ridge part (19) is made round and the valley part (20) is formed to have the same shape so as to engage thereto.

In the designing step, by adjusting the depth (distance from the ridge part to the valley part) of the valley part and the angle (21) formed by the ridge part and the valley part, various stop positions of the sunglass plate (7) can be obtained.

Another multistage stop mechanism will be explained based on FIG. 5. FIG. 5 shows a mechanism of when the base (3) is fixed so as not to rotate with respect to the glasses, and the shaft strip (2), the base contacting strip (4), and the elastic receiving strip (6) are rotatable as one unit. Points (15') (15") are given for purposes of explanation.

As shown in FIG. 5, in the initial stable state, the base (3) is pressed against the base contacting strip (4) by the elastic force of the coiled spring (5) included in the attachment fitting (1). The base (3) and the base contacting strip (4) are engaged with respect to each other and in the stable state.

When the sunglass plates attached to the sunglass plate attaching strip (not shown) arranged on both ends of the shaft strip (2) are pushed upwards from the above state, the shaft strip (2), the base contacting strip (4), and the elastic receiving strip (6) integrally rotate in conjunction therewith. Simultaneously, the shaft strip (2), the base contacting strip (4), and the elastic receiving strip (6) exhibit a movement of moving along the shaft strip (2).

As shown in FIG. 5, the ridge part denoted as point (15') of the base contacting strip (4) moves about the shaft strip (2), in accordance with the rotation thereof, while contacting the valley part (16')—ridge part (17')—valley part (18') of the base (3).

When the ridge part denoted as point (15') of the base contacting strip (4) moves from the valley part (16') to the ridge part (17') of the base (3) in response to the application of the external force to push the sunglass plates upwards, the base contacting strip (4) moves in a direction away from the base (3) against the elastic force of the coiled spring (5) by the applied external force.

When the ridge part denoted as point (15') of the base contacting strip (4) moves from the ridge part (17') to the valley part (18') of the base (3), the base contacting strip (4) now moves so as to return back towards the base (3) by the biasing force of the coiled spring (5). The base (3) and the base contacting strip (4) are thereby again engaged and in the stable state.

The point (15") on the elastic receiving strip (6) also moves about the shaft strip (2) similar to the point (15') on the base contacting strip (4).

The present invention utilizes the elastic property of the coiled spring (5) that the coiled spring (5), with the shape thereof changed within a constant range by the externally applied force, restores again to its original state when the force is removed.

Accordingly, the attachment fitting according to the present invention may, as long as it has the above elastic property, be configured with an elastic body other than the coiled spring such as, rubber or synthetic resin in place of the coiled spring (5).

The sunglass according to the present invention is formed by the attachment fitting having the above mentioned mechanism. The size and material of the attachment fitting and the sunglass plates can be variously set depending on the provided sunglass.

Further, the sunglass according to the present invention is a sunglass freely attachable and detachable to the glasses. An attachment means such as, rod-shaped clip or holding strip and presser rod is arranged as described in the following embodiment to attach the sunglass to the glasses.

The shaft strip extending in the left and right direction from the attachment fitting may be used as the attachment means in addition to serving as the sunglass plate attaching strip, as mentioned above. Other member may be connected to the shaft strip and such member may serve as the attachment means. In the present invention, the shaft strip extending in the left and right direction from the attachment fitting may be processed to any shape. It is essential that either the base or the shaft strip is fixed to the glasses to an extent that one of either the base or the shaft strip does not follow the rotation of the other when the user pushes up/down the sunglass plates.

First Embodiment

A first embodiment of the present invention will now be explained based on the figures.

Figure 6:
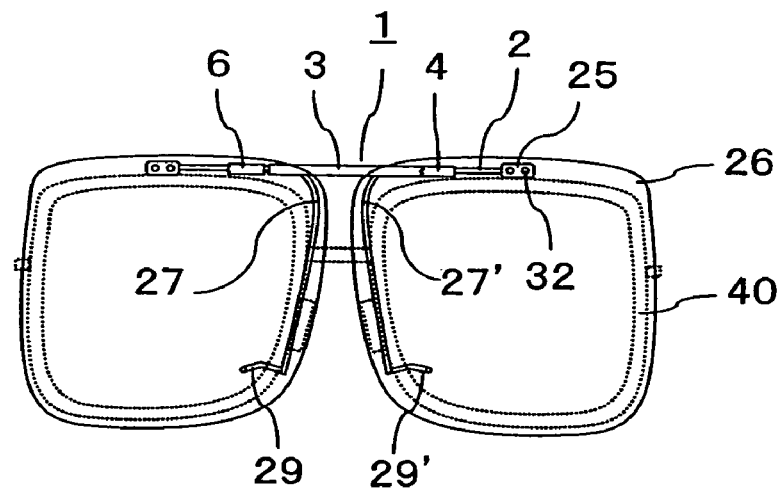
FIG. 6 is a front view of a sunglass according to a first embodiment.
Figure 7:
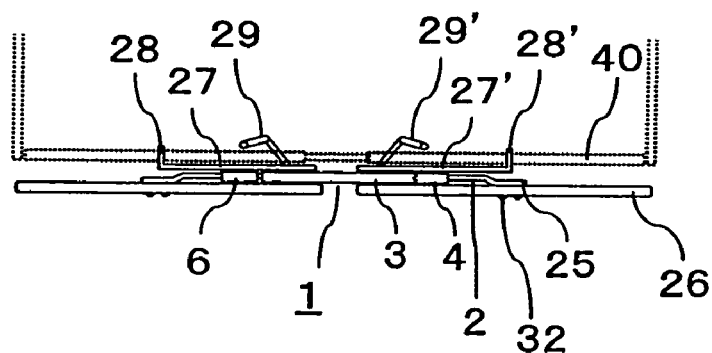
FIG. 7 is a plan view of the sunglass according to the first embodiment.
Figure 8:
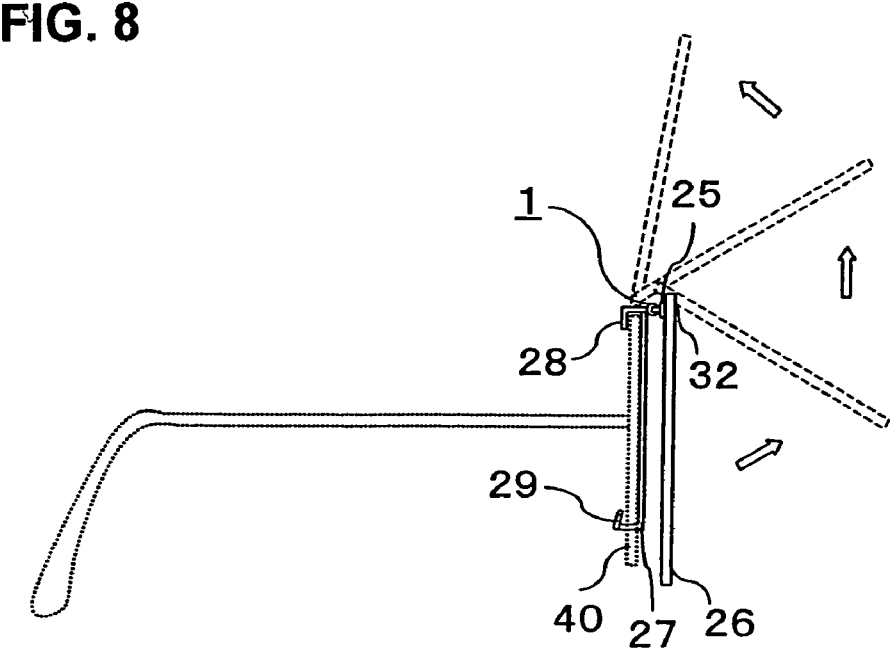
FIG. 8 is a side view of the sunglass according to the first embodiment.
Figure 9A:
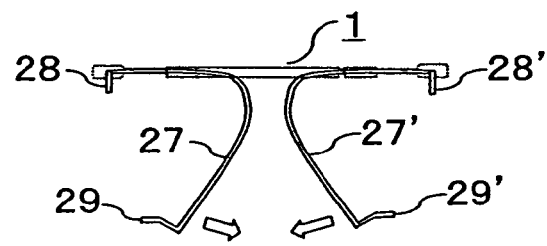
FIG. 9(a) is a view (rear view) showing a rod-shaped clip of the sunglass according to the first embodiment.
Figure 9B:
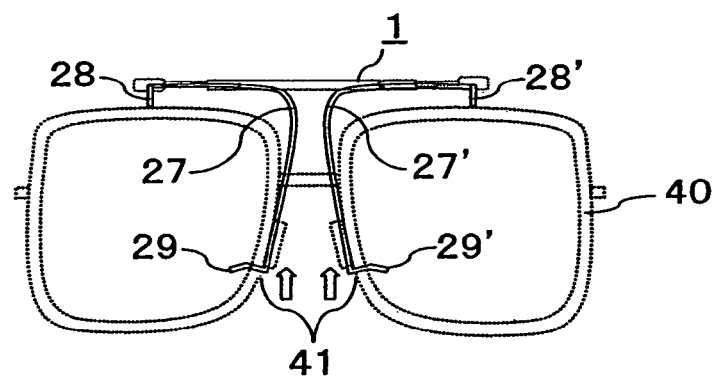
FIG. 9(b) is a view (rear view) showing an attachment state of the sunglass according to the first embodiment.
Figure 9C:
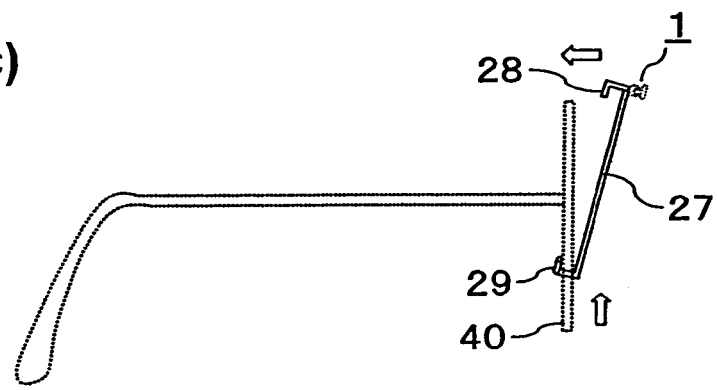
FIG. 9(c) is a view (side view) showing the attachment state of the sunglass according to the first embodiment.
Figure 9D:
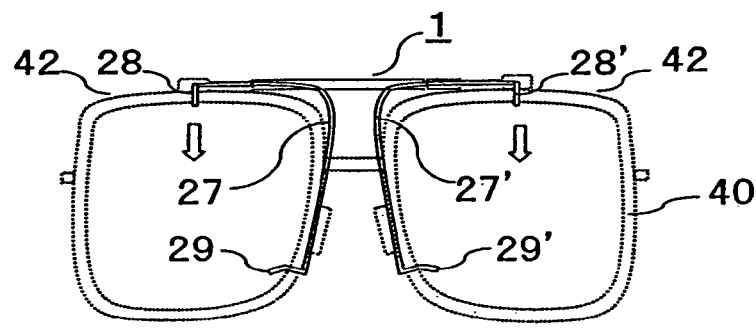
FIG. 9(d) is a view (rear view) showing the attachment completed state of the sunglass according to the first embodiment.

FIG. 6 is a front view of a sunglass according to the first embodiment. FIG. 7 is a plan view of the sunglass according to the first embodiment. FIG. 8 is a side view of the sunglass according to the first embodiment. FIG. 9(*a*) is a view (rear view) showing a rod-shaped clip of the sunglass according to the first embodiment. FIG. 9(*b*) is a view (rear view) showing an attachment state of the sunglass according to the first embodiment. FIG. 9(*c*) is a view (side view) showing the attachment state of the sunglass according to the first embodiment. FIG. 9(*d*) is a view (rear view) showing the attachment completed state of the sunglass according to the first embodiment.

The embodiment relates to a sunglass formed by the attachment fitting (1) shown in FIGS. 1 to 3 and FIG. 5.

The attachment fitting (1) is, as already shown in FIG. 1, configured from the shaft strip (2), the base (3), the base contacting strip (4), the coiled spring (5) and the elastic receiving strip (6). The sunglass shown in FIG. 6 to FIG. 8 is formed by the attachment fitting (1).

In the present embodiment, the shaft strip (2) extending in the left and right direction of the attachment fitting (1) includes sunglass plate attaching strips (25) on both ends, as shown in FIG. 6 to FIG. 8. A pair of left and right sunglass plates (26) is attached to the sunglass plate attaching strips (25) by rivets (32).

As shown in FIG. 9(*a*), symmetrical rod-shaped clips (27) (27') are brazed on the rear surface side of the attachment fitting (1) so as to face each other. The rod-shaped clips (27) (27') are only brazed to the base (3) and are not connected and fixed to the other members.

The sunglass according to the present invention is attached and fixed to the glasses (40) with the rod-shaped clips (27) (27'). When attached, the base (3) connected to the rod-shape clips (27) (27') is integrally fixed to the glasses (40), thus avoiding the base (3) from following the rotation of the shaft strip (2), the base contacting strip (4), and the elastic receiving strip (6).

The attachment method of the sunglass according to the present embodiment will now be explained using FIGS. 9(*a*) to 9(*d*). In FIGS. 9(*a*) to 9(*d*), the illustration of the sunglass plate is omitted.

As shown in FIG. 9(*a*), the rod-shaped clips (27) (27') are formed to a substantially V-shaped form by a rod-shaped member having excellent elasticity (e.g., metal wire material). The ends of the rod-shaped clips (27) (27') are bent and fabricated, thus each forming hook parts (28) (29) (28') (29'). The sunglass according to the present embodiment is attached and fixed to the glasses at four points by a total of four upper and lower hook parts (28) (29) (28') (29') of the left and right rod-shaped clips (27) (27').

During attachment, the lower hook parts (29) (29') are hooked to the internal surface (41) of the glasses with the rod-shaped clips (27) (27') elastically deformed inwardly, and are slid upwards along the internal surface (41) of the glasses, as shown in FIGS. 9(*b*), 9(*c*). Here, the upper hook parts (28) (28') are slid while being pulled in a direction opposite to the glasses (40).

As shown in FIGS. 9(*c*) and 9(*d*), the left and right rod-shaped clips (27) (27') are pushed downwards to hook the upper hook parts (28) (28') to the upper surface (42) of the glasses.

The rod-shaped clips (27) (27') elastically deformed inwardly are thereby restored and elastically attached to the glasses (40) by the biasing force acting outwards.

During detachment, the sunglass according to the present invention can be easily detached from the glasses (40) by performing the operation opposite the above.

When the user wears the sunglass, the sunglass plates (26) are positioned at the front surface of the lenses of the glasses (40), as shown in FIGS. 6 and 7, thus allowing the user to see the view through the sunglass plate (26).

When the user desires to see the view without using the sunglass plates (26), the user simply holds either the left or the right sunglass plate (26) and flips the sunglass plate (26) upwards, as shown in FIG. 8.

The shaft strip (2), the base contacting strip (4), and the elastic receiving strip (6) are interlocked with the sunglass plate (26) by way of the sunglass plate attaching strip (25). When the sunglass plate (26) is pushed upwards, the external force to integrally rotate the shaft strip (2), the base contacting strip (4) and the elastic receiving strip (6) is applied through the sunglass plate attaching strip (25). When the base contacting strip (4) is rotated to a position to again engage the base (3), the sunglass plate (26) is stably stopped.

When the user desires to further flip the sunglass plate (26) upwards, the user simply needs to further push the sunglass plate (26) upwards and rotate the shaft strip (2), the base contacting strip (4), and the elastic receiving strip (6).

The sunglass plate (26) is thus flipped in stages. In the present embodiment, three stage flipping is possible, as shown in FIG. 8.

When the user desires to see the view again using the sunglass plate (26), or to change the stop position of the sunglass plate (26), the user simply needs to rotate the shaft strip (2) in the desired direction by way of the sunglass plate (26).

In the present embodiment, the diameter of the shaft strip (2) is 1 mm, the maximum diameter of the base (3), the base contacting strip (4) and the elastic receiving strip (6) is 2.5 mm, the natural length of the coiled spring (5) serving as the elastic body is 10 mm, and the diameter of wire of the coiled spring (5) is 0.3 mm.

In the stable state, the coiled spring (5) is included in the attachment fitting (1) at a length compressed to approximately half its natural length.

All of the members are made of stainless steel. The sunglass plate attaching strip (25), and the rod-shaped clips (27) (27') are also made of stainless steel.

The sunglass of the present embodiment is configured as above, and thus the attachment fitting (1) is very small and light. Therefore, when the sunglass is attached to the glasses (40), the attachment fitting (1) is not noticeable. Further, even when worn for a long time, the load on the nose of the user is small.

Additionally, the sunglass of the present embodiment has a very smart outer appearance and excellent design, compared to the conventional sunglass shown in FIG. 16.

Further, since the attachment fitting (1) is equipped with the multistage stop mechanism, the user can stably stop the sunglass plate at the preferred position and can easily change such position. Moreover, the sunglass plate (26) is less likely to fall down during use.

The sunglass of the present embodiment is securely sandwiched by the rod-shaped clips (27) (27') and attached to the glasses (40), and thus the sunglass is less likely to fall off during use. With the use of the rod-shaped clips (27) (27') of for example, the present embodiment, the sunglass can be attached to any kind of glasses without having to choose the frame of the glasses. Further, the sunglass plate attaching arm in for example, other embodiment is not necessary and thus the number of members is reduced.

Second Embodiment

A second embodiment of the present invention will now be explained based on the figures.

Figure 10:
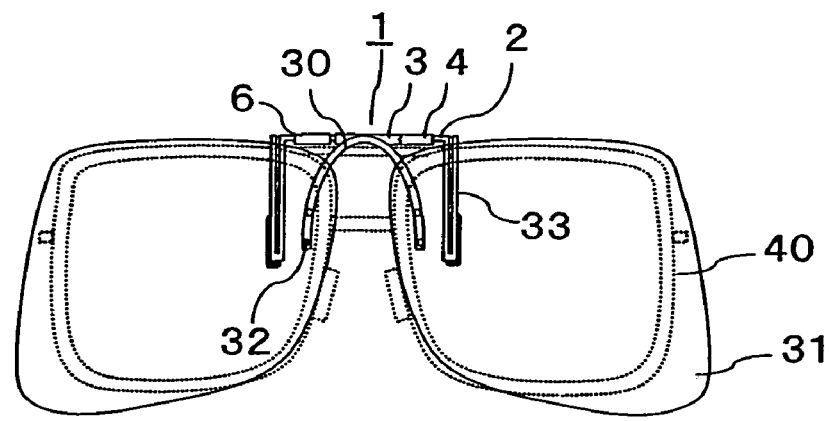
FIG. 10 is a front view of a sunglass according to a second embodiment.
Figure 11:
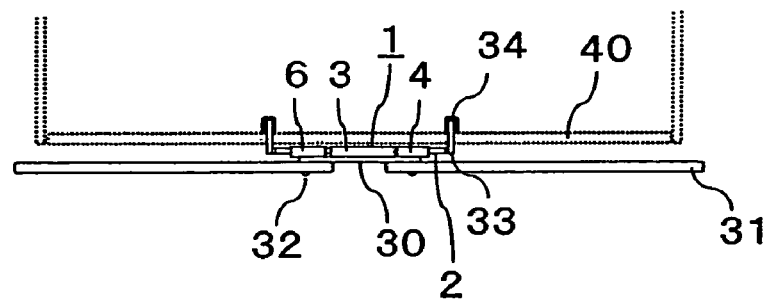
FIG. 11 is a plan view of the sunglass according to the second embodiment.
Figure 12:
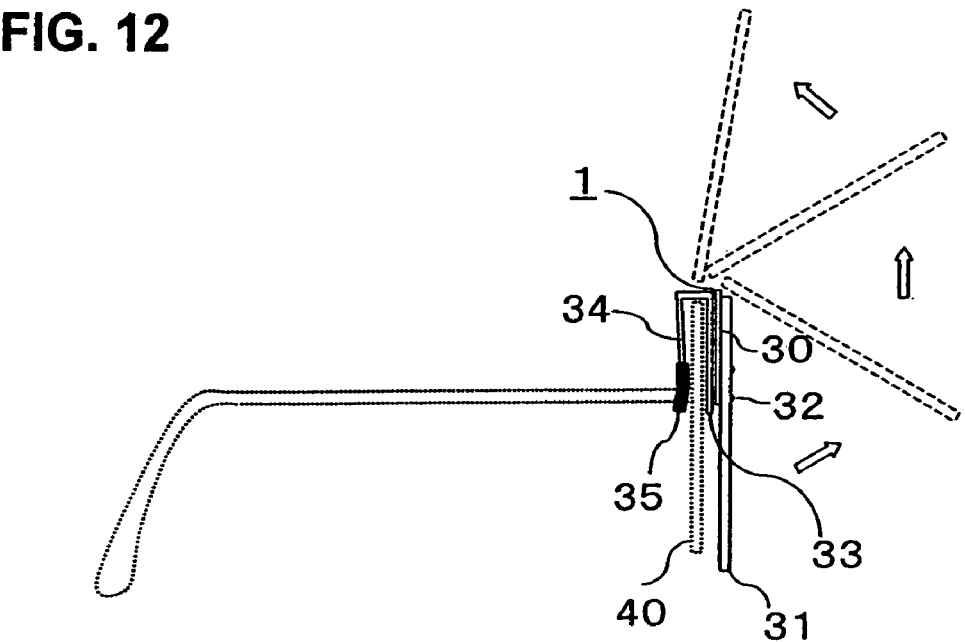
FIG. 12 is a side view of the sunglass according to the second embodiment.

FIG. 10 is a front view of a sunglass according to the second embodiment. FIG. 11 is a plan view of the sunglass according to the second embodiment. FIG. 12 is a side view of the sunglass according to the second embodiment.

The present embodiment relates to the sunglass formed by the attachment fitting (1) shown in FIG. 1 to FIG. 4.

The attachment fitting (1) is, as already shown in FIG. 1, configured by the shaft strip (2), the base (3), the base contacting strip (4), the coiled spring (5), and the elastic receiving strip (6). The sunglass shown in FIG. 10 to FIG. 12 is formed by the attachment fitting (1).

A sunglass plate attaching arm (30) is brazed to the base (3). A pair of left and right sunglass plates (31) is attached to the sunglass plate attaching arm (30) by rivets (32).

In the present embodiment, both ends of the shaft strip (2) extending in the left and right direction of the attachment fitting (1) are bent downward and fabricated, and thus the shaft strip (2) forms the holding strip (33), as shown in FIG. 10 to FIG. 12. The shaft strip (2) is further bent backwards and downwards to form a presser rod (34). A rubber cap (35) is placed at the tip end of the presser rod (34) to prevent damages of the lenses of the glasses (40) and to prevent slippage.

The sunglass according to the present embodiment is placed and attached to the glasses (40) from above so that lenses of the glasses (40) are held between the holding strip (33) and the presser rod (34).

When attached, the holding strip (33) and the presser rod (34) formed by extending the shaft strip (2) are integrally fixed with the glasses (40), thus avoiding the shaft strip (2) from following the rotation of the base (3).

When the user wears the sunglass, the sunglass plate (31) is positioned at the front surface of the lenses of the glasses (40), as shown in FIG. 10 and FIG. 11, thus allowing the user to see the view through the sunglass plate (31).

When the user desires to see the view without using the sunglass plate (31), the user simply holds either the left or the right sunglass plate (31) and flips the sunglass plate (31) upwards, as shown in FIG. 12.

The base (3) moves in conjunction with the sunglass plate (31) by way of the sunglass plate attaching arm (30). When the sunglass plate (31) is pushed upwards, the external force to rotate the base (3) about the shaft strip (2) is applied to the base (3). When the base (3) is rotated to a position to again engage the base contacting strip (4), the sunglass plate (31) is stably stopped.

When the user desires to further flip the sunglass plate (31) upwards, the sunglass plate (31) is further pushed upwards thus rotating the base (3).

The sunglass plate (31) is thus flipped in stages. In the present embodiment, a three stage flipping is possible, as shown in FIG. 12.

When the user desires to see the view again using the sunglass plate (31), or to change the stop position of the sunglass plate (31), the user simply needs to rotate the base (3) in the desired direction by way of the sunglass plate (31).

With the sunglass of the present embodiment, the attachment fitting (1) is configured very small and light as in the previous embodiment.

Since the attachment fitting (1) is equipped with a multistage stop mechanism, the user can easily and reliably stop the sunglass plate (31) at a desired position.

Further, the sunglass of the present embodiment is reliably held and fixed to the glasses (40) by the holding strip (33) and the presser rod (34).

Third Embodiment

A third embodiment of the present invention will now be explained based on the figures.

Figure 13:
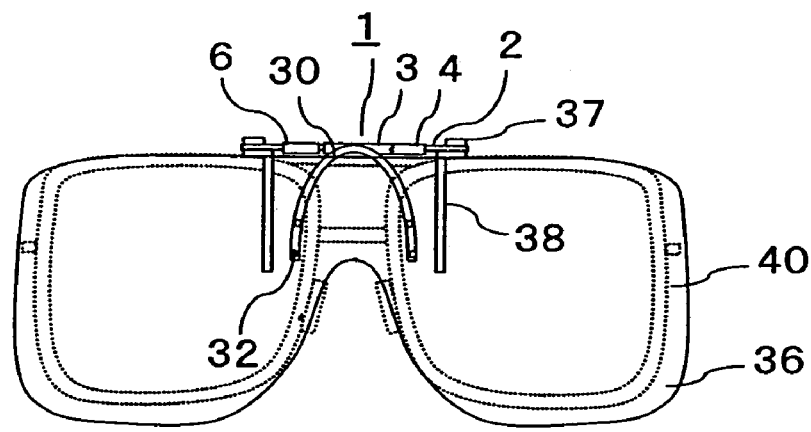
FIG. 13 is a front view of a sunglass according to a third embodiment.
Figure 14:
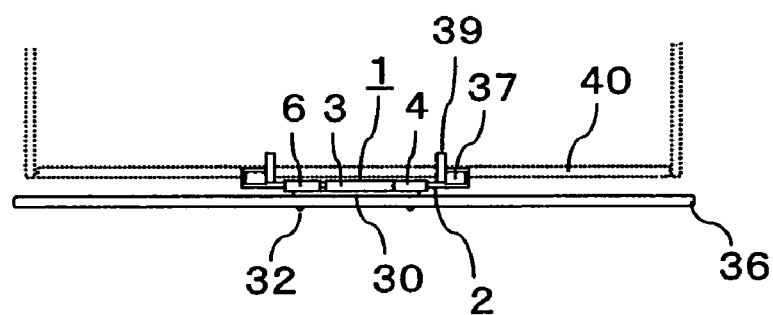
FIG. 14 is a plan view of the sunglass according to the third embodiment.
Figure 15:
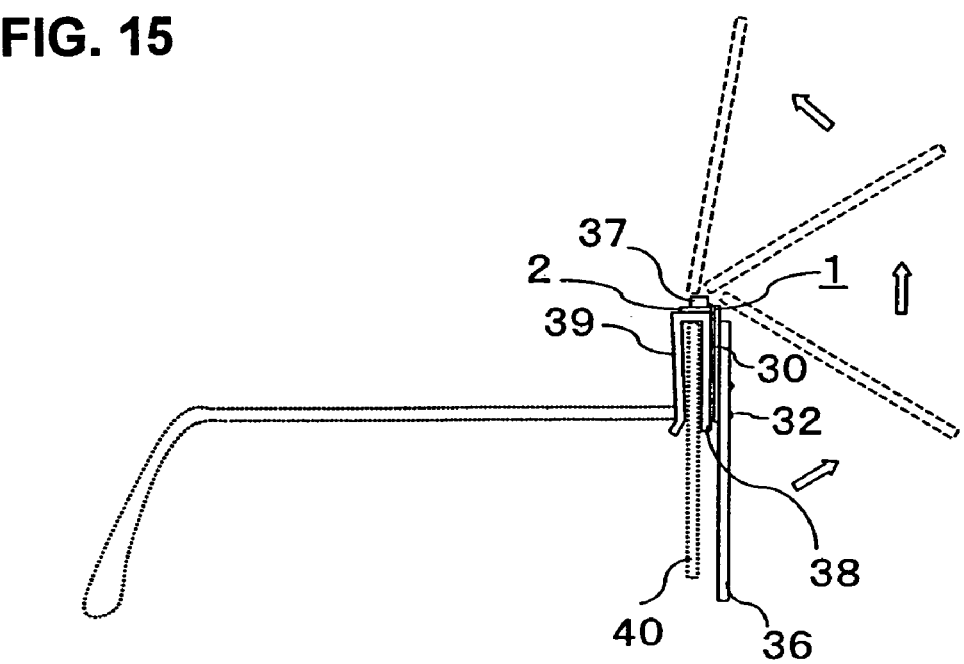
FIG. 15 is a side view of the sunglass according to the third embodiment.

FIG. 13 is a front view of a sunglass according to the third embodiment. FIG. 14 is a plan view of the sunglass according to the third embodiment. FIG. 15 is a side view of the sunglass according to the third embodiment.

The present embodiment relates to other embodiments of the sunglass formed by the attachment fitting (1) shown in FIG. 1 to FIG. 4.

The sunglass plate (36) of the sunglass in the present embodiment is integrally configured by a sheet of sunglass plate, as shown in FIG. 13. The sunglass plate (36) is attached to the sunglass plate attaching arm (30) by rivets (32).

In the present embodiment, as shown in FIG. 13 to FIG. 15, both ends of the shaft strip (2) extending in the left and right direction of the attachment fitting (1) are bent and fabricated in a hook shape in a horizontal surface, and wounded and fixed to a shaft strip supporting body (37).

The shaft strip supporting body (37), the holding strip (38), and the presser rod (39) are integrally molded with a transparent plastic.

The sunglass according to the present embodiment is also attached to the glasses so that the lenses of the glasses (40) are sandwiched between the holding strip (38) and the presser rod (39).

The sunglass plate (36) and the base (3) are interlocked by way of the sunglass plate attaching arm (30). As shown in FIG. 15, by pushing up/down the sunglass plate (36), the sunglass plate (36) stops in stages and stably at a position where the base (3) and the base contacting strip (4) engage.

In the present embodiment, the shaft strip supporting body (37), the holding strip (38), and the presser rod (39) are formed by plastic, and thus the weight of the sunglass is lighter.

Further, since the plastic is transparent, the appearance is simpler. When the user wears the sunglass, the presence of the holding strip (38) and the presser rod (39) is not a problem and a satisfactory view of the user is ensured.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An attachment fitting for a sunglass freely attachable and detachable to glasses, the attachment fitting comprising:
    a shaft strip, extending in a rod-shaped, to which a sunglass plate is attachable to both ends;
    a base through which the shaft strip passes and rotatable with respect to the shaft strip;
    a base contacting strip contacting one end of the base and fixed so as not to rotate with respect to the shaft strip; and
    an elastic receiving strip contacting another end of the base by way of an elastic body and fixed so as not to rotate with respect to the shaft strip; wherein
    a ridge part and a valley part of a shape engaging with each other are arranged on ends of the base and the base contacting strip that contact each other along an outer periphery in an alternately continuing manner;
    the elastic body is elastically held between the base and the elastic receiving strip;
    the base contacting strip is pressed towards the base by an elastic force of the elastic body, and held in a stable state with one ridge part engaging with the other valley part; and
    when the shaft strip rotates in conjunction with the movement of pushing up/pushing down the sunglass plate, the base contacting strip rotates integrally with the shaft strip while contacting the base, and at the same time, the base contacting strip moves in an axial direction away from the base against the elastic force of the elastic body, and further, the base contacting strip moves in the axial direction towards the base in accordance with a biasing force of the elastic body and again engages the base to return to the stable state, thereby allowing the sunglass plate attached to both ends of the shaft strip to be freely raised upwards and lowered downwards and to be freely stopped in stages.

2. The sunglass attachment fitting as claimed in claim 1, wherein the elastic body is a coiled spring.

3. A sunglass freely attachable and detachable to glasses and equipped with a multistage stop function allowing the sunglass plate to be freely raised upwards and lowered downwards; wherein the sunglass is configured using the sunglass attachment fitting as claimed in claim 1 or 2; and attached and fixed to the glasses so that the base does not follow the rotation of the shaft strip.

4. A sunglass freely attachable and detachable to glasses and equipped with a multistage stop function allowing the sunglass plate to be freely raised upwards and lowered downwards; wherein the sunglass is configured using the sunglass attachment fitting as claimed in claim 1 or 2; and attached and fixed to the glasses so that the base does follow the rotation of the shaft strip by attaching a rod-shaped clip, connected and fixed to the base, including a hook part at an end thereof to the glasses.

5. An attachment fitting for a sunglass freely attachable and detachable to glasses, the attachment fitting comprising:
    a shaft strip extending in a rod-shaped;
    a base through which the shaft strip passes and rotatable about the shaft strip and to which a sunglass plate is attachable;
    a base contacting strip contacting one end of the base and fixed so as not to rotate with respect to the shaft strip; and
    an elastic receiving strip contacting another end of the base by way of an elastic body and fixed so as not to rotate with respect to the shaft strip; wherein
    a ridge part and a valley part of a shape engaging with each other are arranged on ends of the base and the base contacting strip that contact each other along an outer periphery in an alternately continuing manner;
    the elastic body is elastically held between the base and the elastic receiving strip;
    the base is pressed against the base contacting strip by an elastic force of the elastic body, and held in a stable state with one ridge part engaging with the other valley part; and
    when the base rotates in conjunction with the movement of pushing up/pushing down the sunglass plate, the base rotates about the shaft strip while contacting the base contacting strip, and at the same time, moves in an axial direction towards the elastic receiving strip against the elastic force of the elastic body, and further, the base moves in the axial direction towards the base contacting strip in accordance with a biasing force of the elastic body and again engages the base contacting strip to return to the stable state, thereby allowing the sunglass plate attached to the base to be freely raised upwards and lowered downwards and to be freely stopped in stages.

6. The sunglass attachment fitting as claimed in claim 5, wherein the elastic body is a coiled spring.

7. A sunglass freely attachable and detachable to glasses and equipped with a multistage stop function allowing the sunglass plate to be freely raised upwards and lowered downwards; wherein the sunglass is configured using the sunglass attachment fitting as claimed in claim 5 or 6; and attached and fixed to the glasses so that the shaft strip extending in the left and right direction from the attachment fitting does not follow the rotation of the base.

\* \* \* \* \*